United States Patent
Jahana

(10) Patent No.: US 8,098,561 B2
(45) Date of Patent: Jan. 17, 2012

(54) OPTICAL DISK DEVICE AND OPTICAL RECEIVER IC

(75) Inventor: Tadashi Jahana, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 198 days.

(21) Appl. No.: 12/491,420

(22) Filed: Jun. 25, 2009

(65) Prior Publication Data

US 2010/0002558 A1    Jan. 7, 2010

(30) Foreign Application Priority Data

Jul. 2, 2008    (JP) ................................ 2008-173408

(51) Int. Cl.
*G11B 7/00*    (2006.01)

(52) U.S. Cl. .................. 369/106; 369/44.41; 369/47.17; 369/47.28; 369/124.12

(58) Field of Classification Search ............... 369/44.41, 369/47.28, 47.17, 106, 107, 124.12
See application file for complete search history.

(56) References Cited

U.S. PATENT DOCUMENTS

| | | | | |
|---|---|---|---|---|
| 2002/0048251 | A1* | 4/2002 | Hikima et al. | 369/124.07 |
| 2006/0083146 | A1* | 4/2006 | Isshiki et al. | 369/112.03 |
| 2007/0053262 | A1* | 3/2007 | Kikugawa et al. | 369/47.28 |
| 2007/0086311 | A1* | 4/2007 | Higashiyama et al. | 369/120 |

FOREIGN PATENT DOCUMENTS

| | | |
|---|---|---|
| CN | 1378207 | 11/2002 |
| JP | 07-073497 | 3/1995 |
| JP | 2003-077161 | 3/2003 |
| JP | 2007-073147 | 3/2007 |

OTHER PUBLICATIONS

Korean Official Action—Sep. 15, 2010.
Chinese Offical Action—200910149693.X—Sep. 21, 2011.

* cited by examiner

*Primary Examiner* — Wayne Young
*Assistant Examiner* — Brenda Bernardi
(74) *Attorney, Agent, or Firm* — Young & Thompson

(57) ABSTRACT

A first optical receiver circuit in an optical receiver IC, which composes an optical disk device, generates a first voltage signal VS1 indicating an amount of light of a laser beam oscillated in a multimode. A second optical receiver circuit generates a second voltage signal VS2 indicating an amount of light of an optical feedback from an optical disk. A binarization circuit extracts a band component corresponding to a predetermined frequency in VS1, and binarizes the band component, thereby obtaining a digital signal. A delay element delays a phase of the digital signal by time equivalent to a phase difference between VS1 and VS2, and outputs the phase delayed signal as a timing signal. A sample hold circuit (S/H) samples and holds the VS2 in synchronization with the timing signal. Further, A LPF eliminates a band component corresponding to the frequency from an output signal of the S/H.

8 Claims, 4 Drawing Sheets

US 8,098,561 B2

OPTICAL DISK DEVICE AND OPTICAL RECEIVER IC

BACKGROUND

1. Field of the Invention

The present invention relates to an optical disk device and an optical receiver IC (Integrated Circuit), and particularly to a device and an IC which reproduce information from an optical disk such as CD (Compact Disk), DVD (Digital Versatile Disk), and BD (Blu-ray Disk).

2. Description of Related Art

Recently, an optical disk device which reproduces CD, DVD and BD or the like is speeding up. Along with that, an operating frequency band of an optical receiver IC used in the device is increasing the bandwidth. In such an optical disk device, the method described below (hereinafter referred to as a high-frequency superimposing method) is widely used. In the high-frequency superimposing method, a driving current, which a high-frequency signal of approximately 350 to 450 MHz is superimposed thereon, is supplied to a laser light source so as to suppress the influence of noise caused by a laser beam reflected at an optical disk upon being reproduced (the laser beam hereinafter referred to as an optical feedback). Thus, the laser light source oscillates in a multimode.

However, further speeding up could result the operating frequency band of the optical receiver IC to be close to the frequency band of the high-frequency signal, thereby making the high-frequency signal itself a noise source. For example, it is expected to reproduce BD at 12× speed or more, which is an upper limit for the spindle speed. However a frequency of a reproduced signal at 12× speed is 198 MHz, and 200 to 400 MHz band is required as an operating frequency of the optical receiver IC used for detecting the reproduced signal. In order to avoid this problem, the frequency of the high-frequency signal can be increased. However this action is not advisable as it leads to increase in the power consumption, generation of EMI (Electro Magnetic Interference), and increase in the circuit size due to additional components to suppress EMI.

Japanese Unexamined Patent Application Publication No. 2007-73147 (Kikukawa et al.) discloses an optical disk device to deal with the above problem. FIG. 3 shows the configuration of this optical disk device. In the optical disk device 1a shown in FIG. 3, a laser driver 202 receives a high-frequency signal from an HF oscillator 201, generates a driving current Id on which the high-frequency signal is superimposed, and supplies the driving current Id to a semiconductor laser element 203. Thus, a laser beam L1 is oscillated from the semiconductor laser element 203 in the multimode (namely, the laser beam L1 is in pulse emission).

The laser beam L1 is converted into a parallel beam by a collimator lens 204 and passes through a polarized beam splitter 205 and a quarter wave plate 206. Then, the laser beam L1 is focused over a recording film surface of an optical disk 2 by an objective lens 207. An optical feedback L2 from the optical disk 2 is collected over a photodiode 209 by a focusing lens 208 and converted into a current. This current is converted into a voltage signal (pulse signal) 301 by a current to voltage converting amplifier 210.

Then, a peak hold circuit (P/H) 211 holds the voltage signal 301 at a peak of the pulse emission in synchronization with a control signal from a variable delay line 212 (the control signal is a high-frequency signal from the HF oscillator 201 with its phase difference from the optical feedback L2 being adjusted). A LPF (Low Pass Filter) 213 eliminates a band component (hereinafter sometimes referred to as a high-frequency superimposing component) corresponding to the frequency of the high-frequency signal from an output signal 302 of the P/H 211 (hereinafter sometimes referred to as a peak hold signal) and obtains a temporally continuous reproduced signal 303.

As described above, the optical disk device 1a is able to eliminate the high-frequency superimposing component.

SUMMARY

However, the inventor has found a problem in the technique disclosed by Kikukawa et al. that the device holds the peak of a noise component which is asynchronous with the high-frequency signal and caused by an electromagnetic induction upon the high-frequency superimposition or the like, thereby deteriorating the quality of the reproduced signal from the optical disk.

Specifically, if peaks N1 to N4 due to the noise component are included in the voltage signal 301 as shown in FIG. 4, the peak hold signal output from the P/H 211 holds not the peak of the voltage signal 301 which should be actually held but the peaks N1 to N4. Therefore, as shown in FIG. 4, waveform distortions S1 to S4 are generated in the reproduced signal 303 where the LPF 213 obtains by eliminating the high-frequency superimposing component from the peak hold signal.

An exemplary aspect of an embodiment of the present invention is an optical disk device that includes a laser light source that oscillates in a multimode, a first optical receiver circuit that receives a laser beam oscillated from the laser light source and generates a first electronic signal indicating an amount of light of the laser beam, an optical system that projects the laser beam to an optical disk, a second optical receiver circuit that receives an optical feedback from the optical disk and generates a second electronic signal indicating an amount of light of the optical feedback, a binarization circuit that extracts a band component corresponding to a predetermined frequency in the first electronic signal and binarizes the band component, a delay circuit that delays a phase of the binarized signal by time equivalent to a phase difference between the first electronic signal and the second electronic signal, and a sample hold circuit that samples and holds the second electronic signal in synchronization with the phase delayed signal.

Another exemplary aspect of an embodiment of the present invention is an optical receiver IC that includes an optical receiver circuit that receives a laser beam oscillated in a multimode and generates a first electronic signal indicating an amount of light of the laser beam, a second optical receiver circuit that receives an optical feedback by an optical disk of the laser beam and generates a second electronic signal indicating an amount of light of the optical feedback, a binarization circuit that extracts a band component corresponding to a predetermined frequency in the first electronic signal and binarizes the band component, a delay circuit that delays a phase of the binarized signal by time equivalent to a phase difference between the first electronic signal and the second electronic signal, and a sample hold circuit that samples and holds the second electronic signal in synchronization with the phase delayed signal.

Namely, in the present invention, a timing (signal) for sampling and holding is generated only from a band component (for example high-frequency superimposing component) corresponding to a predetermined frequency in a laser beam oscillated in the multimode. Therefore, the peak of an optical feedback from the optical disk can be accurately held regardless of the influence of noise component. Accordingly, the abovementioned distortions are not generated in the waveform of the reproduced signal.

Further, the abovementioned timing can be accurately generated irrespective of fluctuation of the emission timing of the laser beam caused by the heat and temporal change of the laser light source, or the like.

The present invention enables to reduce the influence of the noise component which is asynchronous with the high-frequency signal, thereby largely improving the quality of the reproduced signal as compared to the technique disclosed by Kikukawa et al.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

Figure 1:
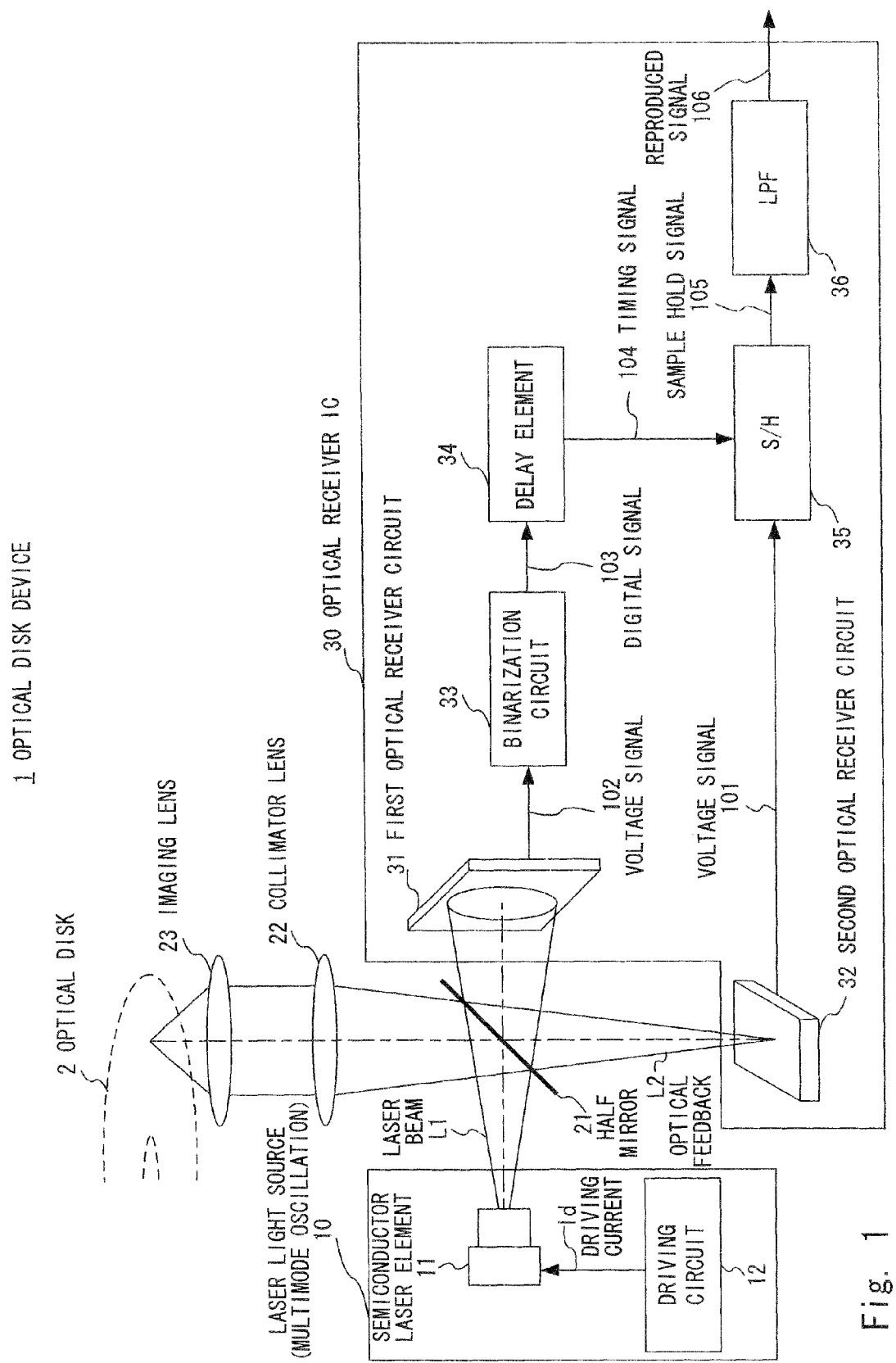
FIG. 1 is a block diagram showing a configuration example of an optical disk device and an optical receiver IC according to an exemplary embodiment of the present invention.

Hereafter, an exemplary embodiment of an optical disk device and an optical receiver IC according to the present invention will be described with reference to FIGS. 1 and 2. In the drawings, components identical are denoted by reference numerals identical to those therein with duplicative description omitted as necessary for the clarity of the explanation.

Figure 2:
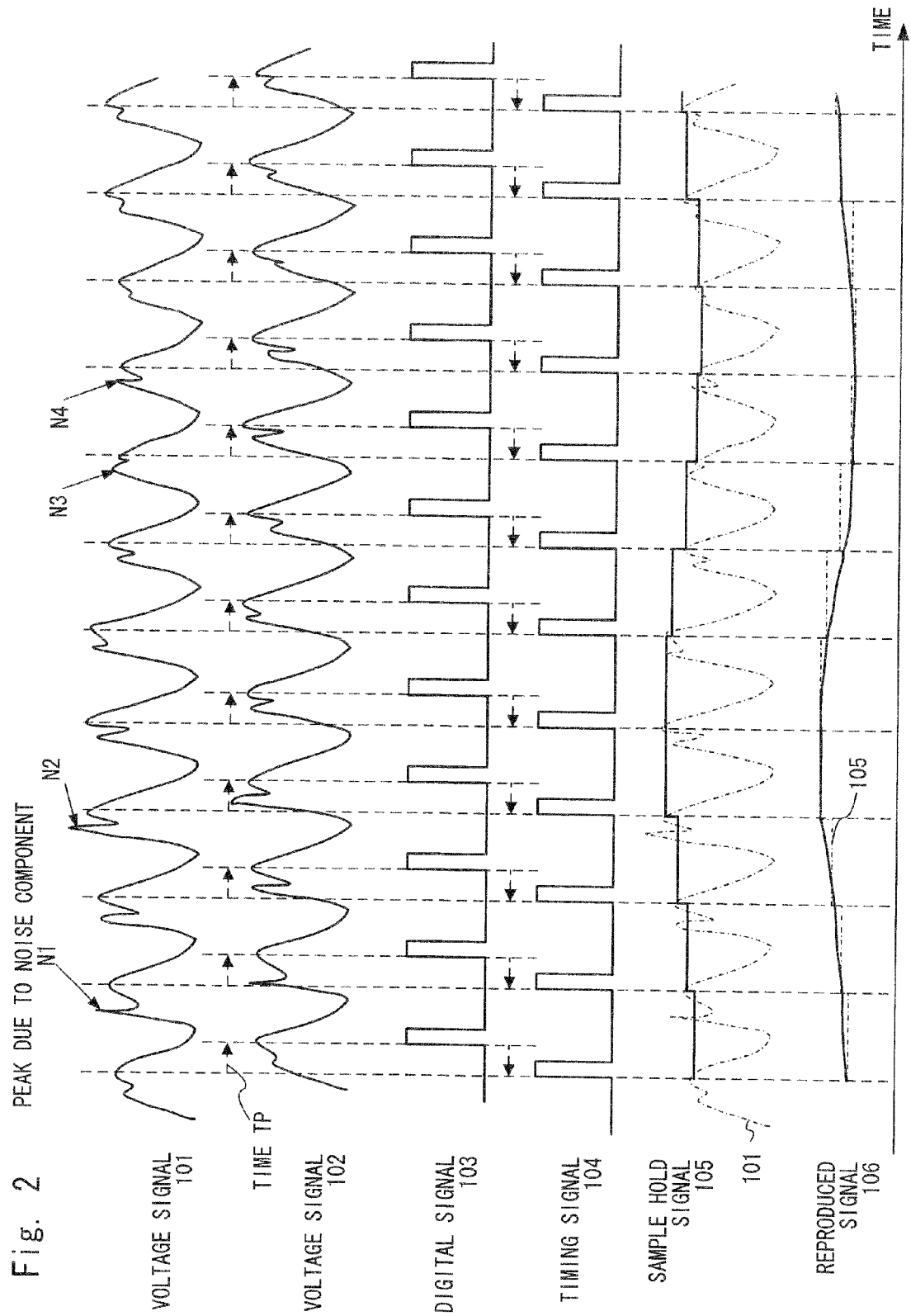
FIG. 2 is a time chart showing an operation example of the optical disk device and the optical receiver IC according to the exemplary embodiment of the present invention.
Figure 3:
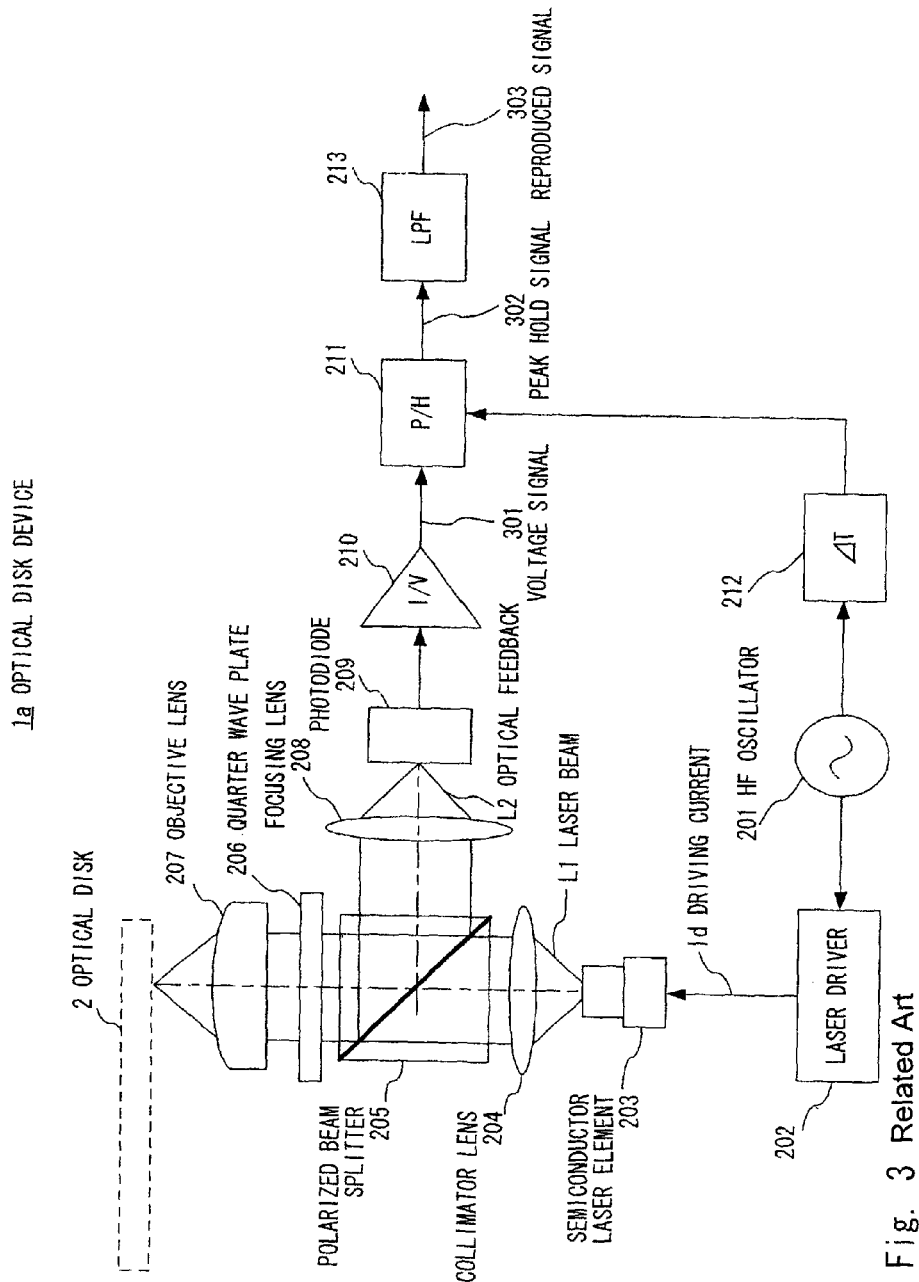
FIG. 3 is a block diagram showing a configuration example of an optical disk device according to a related art.

As shown in FIG. 1, an optical disk device 1 according to this embodiment is roughly composed of a laser light source 10, an optical system, and an optical receiver IC 30. The laser light source 10 oscillates in a multimode. The optical system includes a half mirror 21, a collimator lens 22, and an imaging lens 23. Further, the optical system projects a laser beam L1, which is oscillated from the laser light source 10, to an optical disk 2. The optical receiver IC 30 obtains a reproduced signal 106 based on the laser beam L1 which has passed the half mirror 21 and an optical feedback L2 from the optical disk 2. Although not shown, the abovementioned optical system also includes optical elements such as a diffraction grating and a quarter wave plate.

Further, the laser light source 10 includes a semiconductor laser element 11 oscillating the laser beam L1, and a driving circuit 12 supplying a driving current Id to the laser element 11. For the laser element 11, either of a laser element which oscillates in a single mode (hereinafter sometimes referred to as a single mode laser element) or a self-oscillation type laser element which oscillates in the multimode (hereinafter sometimes referred to as a multimode laser element) can be used. When the single mode laser element is used, the driving circuit 12 superimposes a high-frequency signal on the driving current Id. The subsequent explanation assumes the case of mainly using the single mode laser element.

The optical receiver IC 30 according to this embodiment includes a first optical receiving circuit 31, a second optical receiving circuit 32, a binarization circuit 33, a delay element 34, a sample hold circuit (S/H) 35, and an LPF 36. The first optical receiver circuit 31 receives the laser beam L1 and generates a voltage signal (pulse signal) 102 indicating the amount of light of the laser beam L1. The second optical receiver circuit 32 receives the optical feedback L2 and generates a voltage signal (pulse signal) 101 indicating the amount of light of the optical feedback L2. The binarization circuit 33 extracts a high-frequency superimposing component in the voltage signal 102 to binarize so as to obtain a digital signal 103. The delay element 34 delays the phase of the digital signal 103 by time equivalent to a phase difference between the voltage signals 101 and 102, and outputs the delayed signal as a timing signal 104. The S/H 35 samples and holds the voltage signal 101 in synchronization with the timing signal 104. The LPF 36 eliminates the high-frequency superimposing component from an output signal 105 of the S/H 35 (the output signal hereinafter sometimes referred to as a sample hold signal) to obtain a temporally continuous reproduced signal 106.

The first optical receiving circuit 31 mentioned above can be simply configured by using a photodiode which generates a current corresponding to the amount of light of the laser beam L1 and a current to voltage conversion circuit which converts the current outputted from the photodiode into the voltage signal 102, for example. Similarly, the second optical receiving circuit 32 mentioned above can be configured by using a photodiode which generates a current corresponding to the amount of light of the optical feedback L2 and a current to voltage conversion circuit which converts the output current from the photodiode into the voltage signal 101. Further, the binarization circuit 33 can be configured by using a band-pass filter which passes a band component near the frequency of the high-frequency signal and a zero-crossing comparator which digitalizes an output from the band-pass filter, for example. The delay time of the digital signal 103 by the delay element 34 can be specified in view of an optical path difference between the laser beam L1 and the optical feedback L2, and processing time in the circuits 31 to 33, or the like.

Note that if the multimode laser element is used for the laser light source 10, the binarization circuit 33 extracts a band component corresponding to a predetermined frequency in the voltage signal 102 to binarize. The LPF 36 eliminates this band component from the sample hold signal 105.

Next, an operation of this embodiment will be explained in detail with reference to FIG. 2.

Figure 4:
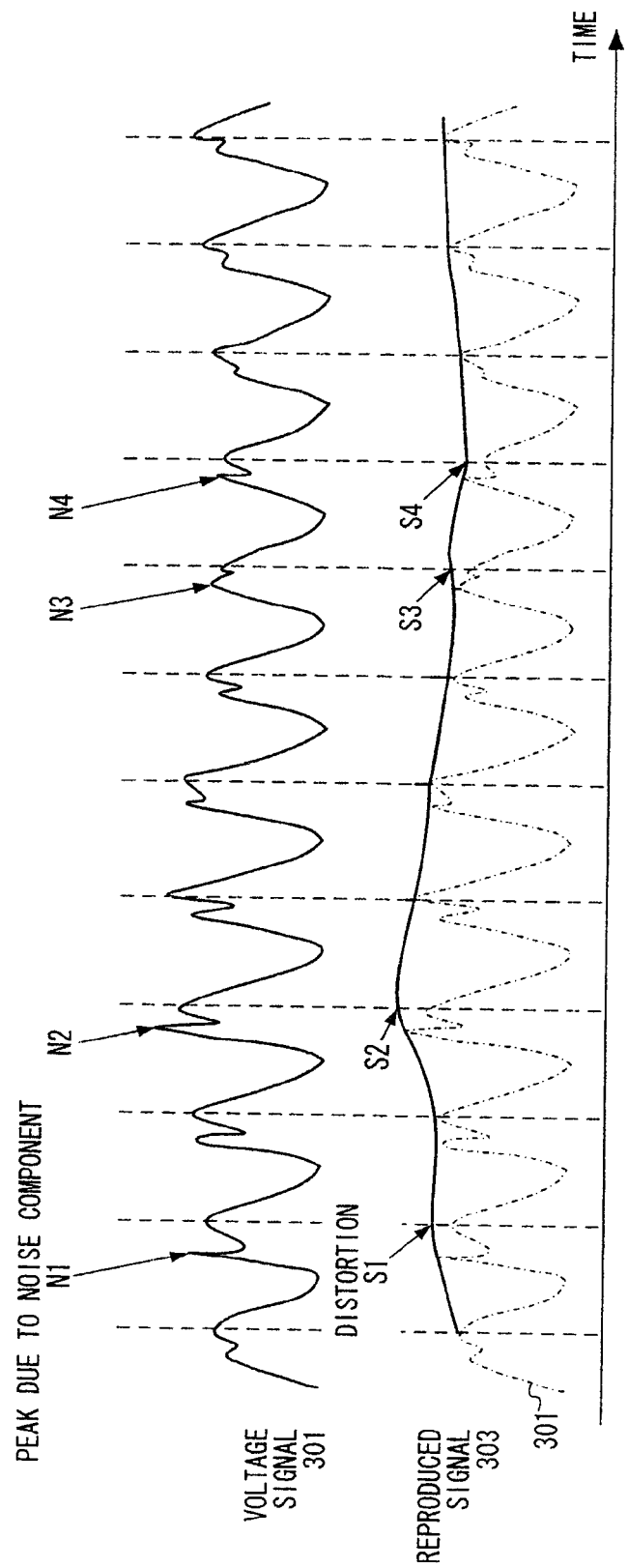
FIG. 4 is a time chart for explaining the problem of the optical disk device according to the related art.

First, the laser beam L1 oscillated from the laser light source 10 is reflected by the half mirror 21, and converted into a parallel beam by the collimator lens 22. Then, the laser beam L1 is focused over a recording film surface of the optical disk 2 by the imaging lens 23. The optical feedback L2 including recorded information from the optical disk 2 passes through the imaging lens 23, the collimator lens 22, and the half mirror 21 in order. Then, the optical feedback L2 is received by the second optical receiving circuit 32. As shown in FIG. 2, the second optical receiver circuit 32 converts the optical feedback L2 into the voltage signal 101 to be supplied to the S/H 35. It is assumed that the voltage signal 101 includes the peaks N1 to N4 due to the noise component which is asynchronous with the high-frequency signal and caused by the electromagnetic induction upon the high-frequency superimposition or the like, as with the voltage signal 301 shown in FIG. 4.

On the other hand, the laser beam L1 having passed through the half mirror 21 is directly received by the first optical receiver circuit 31. As shown in FIG. 2, the first optical receiver circuit 31 converts the laser beam L1 into the voltage signal 102 to be supplied to the binarization circuit 33. As shown in FIG. 2, the voltage signal 102 changes by the same cycle as the voltage signal 101, but the phase thereof is advanced with respect to that of the voltage signal 101 by time TP.

The binarization circuit 33 extracts the high-frequency superimposing component in the voltage signal 102 to binarize, and thereby generates the digital signal 103 which represents "1" in accordance with peaks other than the peaks due to the noise component in the voltage signal 102 but otherwise represents "0". Then, the binarization circuit 33 supplies the digital signal 103 to the delay element 34.

The delay element 34 delays the phase of the digital signal 103 by the time TP, and thereby generates the timing signal 104 which represents "1" in accordance with peaks other than the peaks N1 to N4 in the voltage signal 101 but otherwise represents "0". Then, the delay element 34 supplies the timing signal 104 to the S/H 35.

The S/H 35 holds the peaks other than the peaks N1 to N4 in the voltage signal 101 in synchronization with the timing signal 104, and supplies to the LPF 36 the held signal as the sample hold signal 105. Therefore the LPF 36 is able to obtain the reproduced signal 106 not including the distortions S1 to S4 shown in FIG. 4 by eliminating the high frequency superimposing component from the sample hold signal 105.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. An optical disk device comprising:
   a laser light source that oscillates in a multimode;
   a first optical receiver circuit that receives a laser beam oscillated from the laser light source and generates a first electronic signal indicating an amount of light of the laser beam;
   an optical system that projects the laser beam to an optical disk;
   a second optical receiver circuit that receives an optical feedback from the optical disk and generates a second electronic signal indicating an amount of light of the optical feedback;
   a binarization circuit that extracts a band component corresponding to a predetermined frequency in the first electronic signal and binarizes the band component;
   a delay circuit that delays a phase of the binarized signal by time equivalent to a phase difference between the first electronic signal and the second electronic signal; and
   a sample hold circuit that samples and holds the second electronic signal in synchronization with the phase delayed signal.

2. The optical disk device according to claim 1, further comprising a band limitation circuit that eliminates a band component corresponding to the frequency from the signal sampled and held.

3. The optical disk device according to claim 1, wherein the laser light source includes:
   a laser element that oscillates in a single mode; and
   a driving circuit that supplies a driving current to the laser element, the driving current being superimposed with a high-frequency signal.

4. The optical disk device according to claim 1, wherein the laser light source is a self-oscillation type laser element that oscillates in the multimode.

5. The optical disk device according to claim 1, wherein the first optical receiver circuit and the second optical circuit each include an element that generates a current depending on the amount of light, and a conversion circuit that converts the current into a voltage signal.

6. An optical receiver IC comprising:
   an optical receiver circuit that receives a laser beam oscillated in a multimode and generates a first electronic signal indicating an amount of light of the laser beam;
   a second optical receiver circuit that receives an optical feedback by an optical disk of the laser beam and generates a second electronic signal indicating an amount of light of the optical feedback;
   a binarization circuit that extracts a band component corresponding to a predetermined frequency in the first electronic signal and binarizes the band component;
   a delay circuit that delays a phase of the binarized signal by time equivalent to a phase difference between the first electronic signal and the second electronic signal; and
   a sample hold circuit that samples and holds the second electronic signal in synchronization with the phase delayed signal.

7. The optical receiver IC according to claim 6, further comprising a band limitation circuit that eliminates a band component corresponding to the frequency from the signal sampled and held.

8. The optical receiver IC according to claim 6, wherein the first optical receiver circuit and the second optical circuit each include an element that generates a current depending on the amount of light, and a conversion circuit that converts the current into a voltage signal.

* * * * *